(12) United States Patent
Bardazzi

(10) Patent No.: US 7,640,842 B2
(45) Date of Patent: Jan. 5, 2010

(54) PREPACKED SERVING FOR ESPRESSO COFFEE MACHINE, AND DISPENSING UNIT SUITABLE FOR USE WITH THE SAID SERVING

(76) Inventor: Bruno Bardazzi, Località S. Giovanni in Petroio, I-50037 San Piero a Sieve (IT)

( * ) Notice: Subject to any disclaimer, the term of this patent is extended or adjusted under 35 U.S.C. 154(b) by 405 days.

(21) Appl. No.: 10/588,847

(22) PCT Filed: Mar. 7, 2005

(86) PCT No.: PCT/EP2005/051020

§ 371 (c)(1),
(2), (4) Date: Aug. 9, 2006

(87) PCT Pub. No.: WO2005/090196

PCT Pub. Date: Sep. 29, 2005

(65) Prior Publication Data
US 2007/0181003 A1     Aug. 9, 2007

(30) Foreign Application Priority Data
Mar. 12, 2004   (IT)   ............. GE2004A0020

(51) Int. Cl.
*A47J 31/06* (2006.01)
(52) U.S. Cl. ............................................ 99/295
(58) Field of Classification Search ........... 99/275–295
See application file for complete search history.

(56) References Cited

U.S. PATENT DOCUMENTS

| 5,104,666 | A | * | 4/1992 | Sanvitale ................. 426/77 |
| 5,127,318 | A | * | 7/1992 | Selby, III ................. 99/295 |
| 5,242,702 | A | | 9/1993 | Fond et al. |
| 5,343,799 | A | * | 9/1994 | Fond ..................... 99/295 |
| 5,472,719 | A | | 12/1995 | Favre et al. |
| 5,948,455 | A | | 9/1999 | Schaeffer et al. |
| 2003/0172813 | A1 | | 9/2003 | Schifferle |

FOREIGN PATENT DOCUMENTS

EP     1 364 605     11/2003

\* cited by examiner

*Primary Examiner*—Daniel L Robinson
(74) *Attorney, Agent, or Firm*—Stites & Harbison PLLC; Marvin Petry; Stephen J. Weyer

(57) ABSTRACT

Prepacked serving of coffee powder, particularly for an espresso coffee making machine, comprising a cartridge (1) enclosing a given portion of coffee powder (40), the said cartridge (1) comprising an essentially cylindrical side wall (101) provided at its two ends with a first wall (201) designed to be acted upon by the pressurized hot-water supply means, and with a second wall (301) designed to be acted upon by the brewed coffee dispensing means, the said cartridge (1) being made of an essentially airtight material, and the said wall (301) being continuous and made of a thermoplastic material.

11 Claims, 4 Drawing Sheets

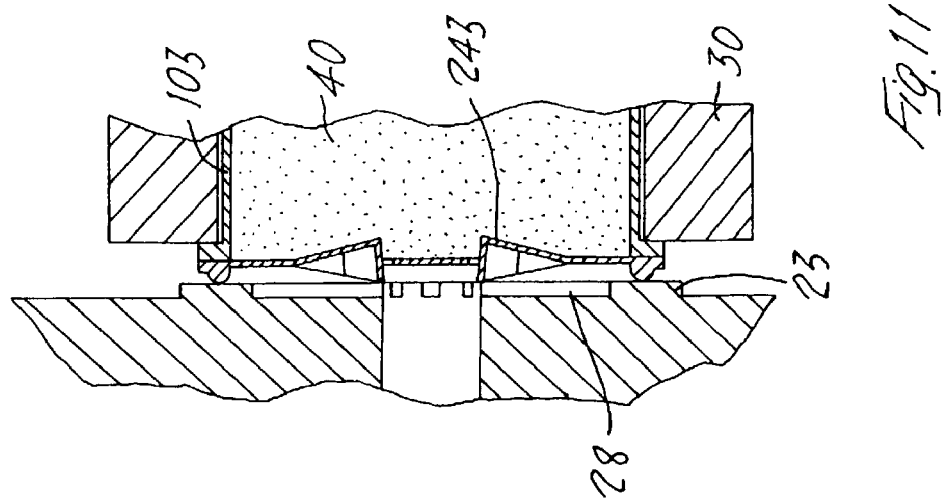
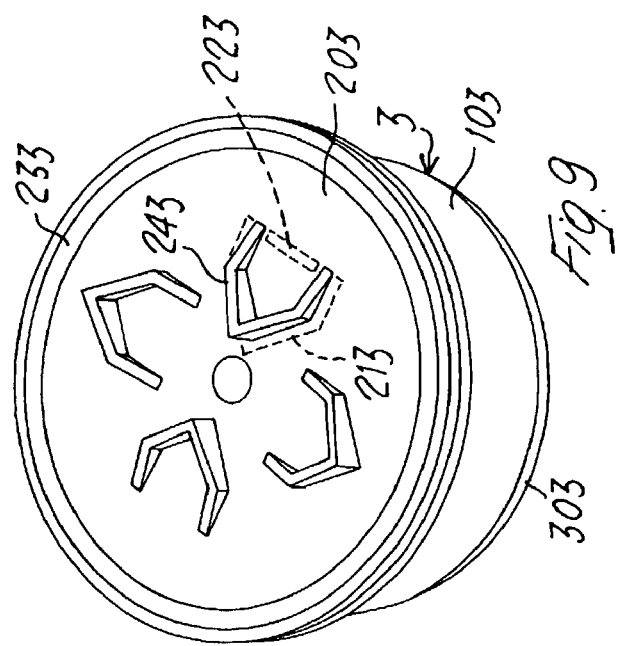
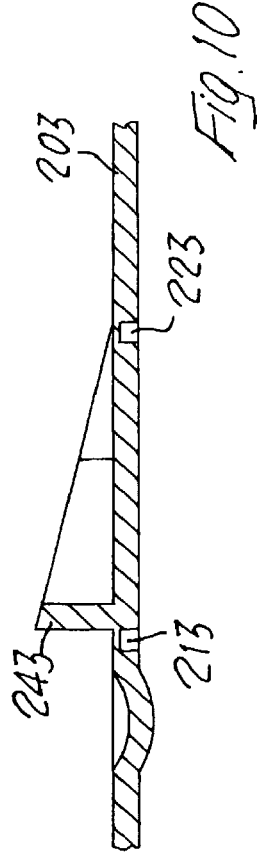

PREPACKED SERVING FOR ESPRESSO COFFEE MACHINE, AND DISPENSING UNIT SUITABLE FOR USE WITH THE SAID SERVING

The present invention relates to a prepacked serving of coffee powder for use in espresso coffee machines, and to a dispensing unit for an espresso coffee making machine suitable for use with the said prepacked serving.

There is an increasing trend for espresso coffee to be made with cartridges containing prepacked coffee servings and using machines in which the dispensing units are specially made to reach the best result from the particular cartridge that is used. There is no doubt that the use of prepacked servings makes operations much easier and renders the use of the machines highly adaptable to different user requirements, being characterised by great practicality, cleanliness and most importantly a good average quality of product, meaning the brewed coffee which is served.

Many problems have to be overcome in providing a system capable of performing satisfactorily in this area, and they relate to numerous aspects of both production and operations. In the first place, the choice of the material and shape to be given to the cartridge is the outcome of a series of considerations covering on the one hand how to ensure the best movement of the hot water through the coffee powder, and on the other hand how to ensure that its movement is slow enough for the powder to be brewed, this stage is usually known as prebrewing. Many different products have been supplied for this purpose.

In many cartridges, the walls next to the water dispensing means and next to the brewed coffee dispensing means are made of a material that is permeable or perforated to make it so. This simplifies the manufacture of the coffee machine's dispensing unit, but it is not possible to bring about a certain pressure increase inside the cartridge for better brewing. In any case, this kind of cartridge is inevitably permeable to the air and therefore must itself be packed in such a way as to prevent ageing, and especially the development of rancid qualities (oxidation of the coffee) in the coffee powder contained inside it. To avoid this problem, these cartridges are normally packed in an inert atmosphere, in an operation that has extremely high costs when set against the cost of a single cartridge.

In another approach, the cartridge is made entirely of an impermeable material, plastic or metal, and is perforated at one end by the pressurized hot-water supply means. The cartridge then "explodes" against a plurality of reliefs which burst the opposite wall and which contain a plurality of channels communicating with the coffee dispensing means. This system not only requires very high operating pressures, but is also based on passing the brewed coffee through very tortuous passages, which can easily become blocked up because of the inherent nature of the brew, namely the presence of solid particles, oils and fats.

It is therefore an object of the present invention to provide a prepacked serving of coffee powder for an espresso machine which will not only not make it difficult to reach the kind of pressures that will produce a brew of pleasing quality, but will also protect the machine in which it is used from potential clogging due to build-up of the particulates and oils present in the brew, and it has a competitive packing cost.

A further object of the present invention is a dispensing unit that can be used effectively with the said serving, and that is of a simple structure and capable of operating without requiring repeated maintenance and cleaning.

The object of the present invention is therefore a prepacked serving of coffee powder, particularly for an espresso coffee making machine, comprising a cartridge enclosing a given portion of coffee powder, the said cartridge comprising an essentially cylindrical side wall provided at its two ends with a first wall designed to be acted upon by the pressurized hot-water supply means, and with a second wall designed to be acted upon by the brewed coffee dispensing means, the said cartridge being made of an essentially airtight material, and the said wall being continuous and made of a thermoplastic material.

In a preferred embodiment the said first wall is provided with predetermined fracture areas to facilitate the action of the pressurized hot-water supply means. Means for diffusing the pressurized hot water over the surface of the coffee serving contained in the said cartridge may also be provided on the said first wall.

Similarly, the said second wall may also have means for channelling and collecting the brew which comes out of the compressed coffee powder contained in the cartridge. The structure of the said first and second walls may also be at least partly stiffened in order to locally differentiate the resistance to piercing.

Another subject of the present invention is a dispensing unit for an espresso coffee making machine that can be used with a prepacked serving of the type described above, the unit comprising pressurized hot-water supply means, a brewing chamber and dispensing means for dispensing the brewed coffee; the said dispensing means comprise perforating means for forming at least one hole in that wall of the cartridge of the said serving which faces the said means, the lips of the said hole forming a seal around the said perforating means until a defined pressure has built up.

Other advantages and features will be shown in the following detailed description of certain embodiments of the present invention. The description is given by way of non-restrictive example and refers to the appended plates for the drawings, in which:

FIG. 9 is a perspective view of a fourth variant of the invention;

FIG. 10 is a cross section through a detail of the cartridge as seen in FIG. 9; and FIG. 11 is a detail in cross section showing the operation of the cartridge seen in FIG. 9.

Figure 1:
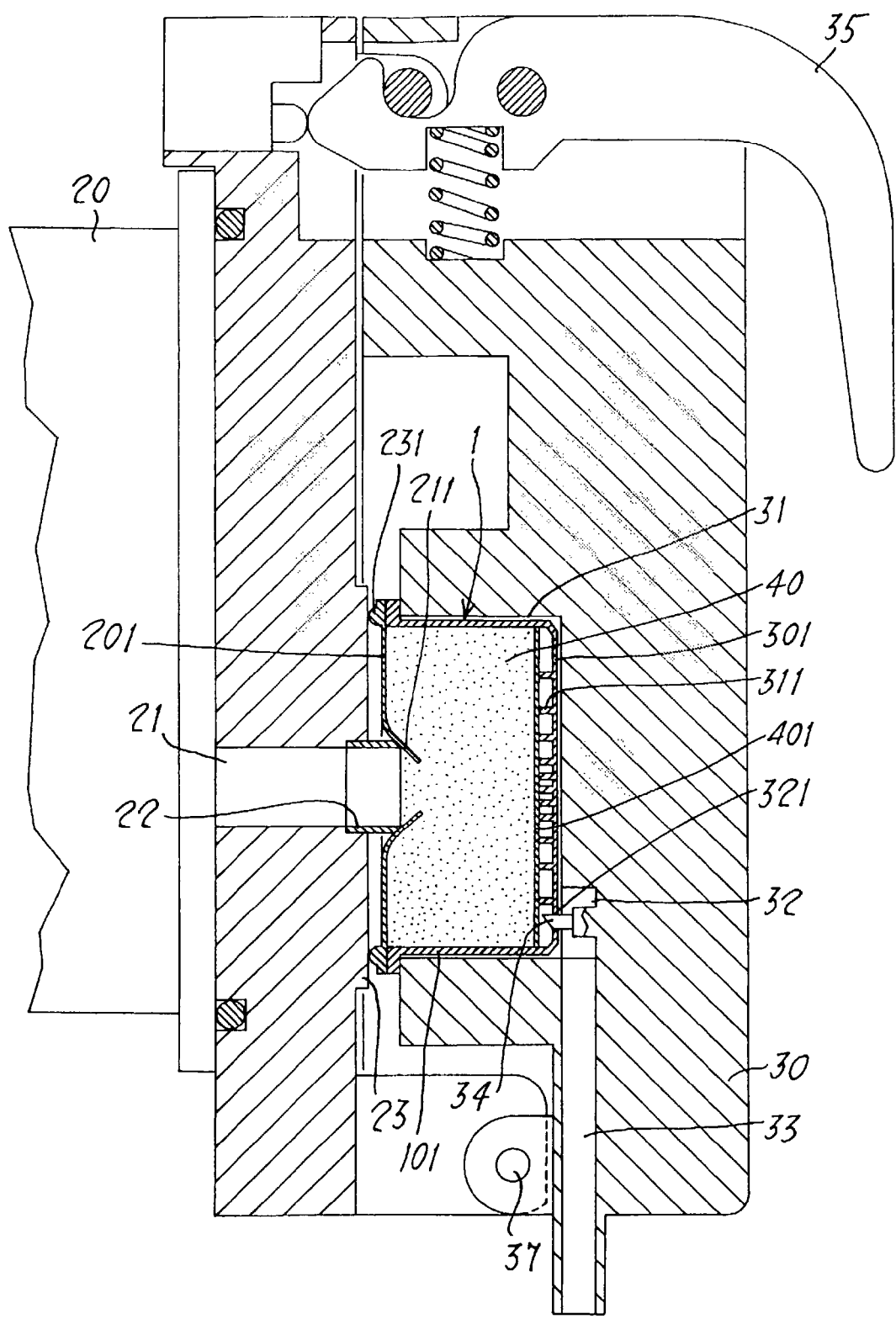
FIG. 1 is a cross section through a first embodiment of the present invention.

FIG. 1 shows a first embodiment of the present invention: reference 1 is the prepacked cartridge containing the serving of coffee. The cartridge 1, containing the coffee powder 40, is placed in the brewing chamber 31 recessed into the door 30 of an espresso coffee making machine. This door is hinged to the machine at 37 and is provided with an opening lever 35. The cartridge 1 comprises a cylindrical side wall 101, and a wall 201 which faces the head 23 containing the axial mouth 22 communicating with hot-water supply pipe 21, which in turn communicates with the boiler 20. As can be seen, around the edge of the wall 201 is the annular relief 231 which makes leak-tight contact with the head 23, the wall 201 having been axially broken in at the portions 211 by the mouth 22.

On the opposite side of the cartridge 1, the wall 301 facing the back wall of the brewing chamber 31 contains the diffusion partitions 311, on which the layer of filter material 401, paper or the like rests and which separates the said wall 301 from the coffee powder 40. The dispensing manifold 32 communicating with the dispensing pipe 33 is formed in the back wall of the chamber 31: projecting axially from the said manifold is the punch 34 which in the figure is shown stuck into the wall 301, forming the hole 321.

Figure 2:
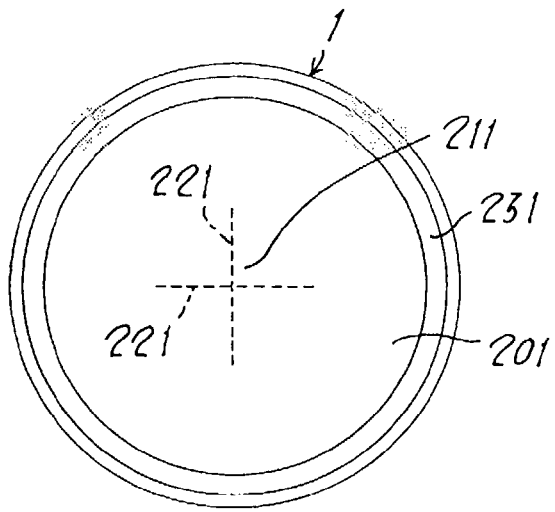
FIG. 2 is a top view of the cartridge according to the invention.
Figure 3:
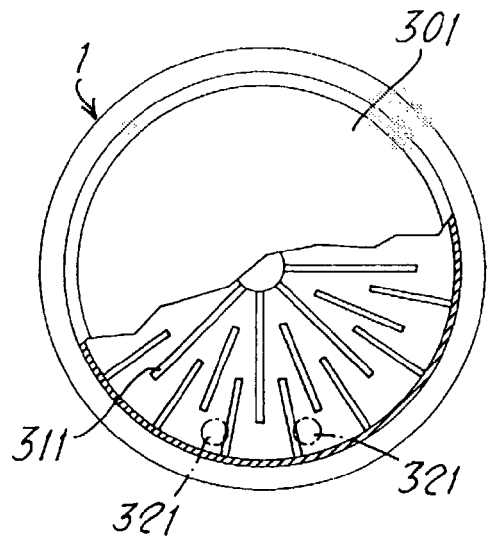
FIG. 3 is a bottom view, partly torn away, of the cartridge from FIG. 2.

FIGS. 2 and 3 show more clearly the features of the cartridge of the invention (identical numerals are used for identical parts). As can be seen, in the centre of the wall 201 of the cartridge 1 are two prefracture lines 221 which allow the portions 211 to break under the action of the mouth 22. Similarly, two holes 321 are shown in chain line on the wall 301, the angular distance between them being different from that between two consecutive partitions 311.

Figure 4:
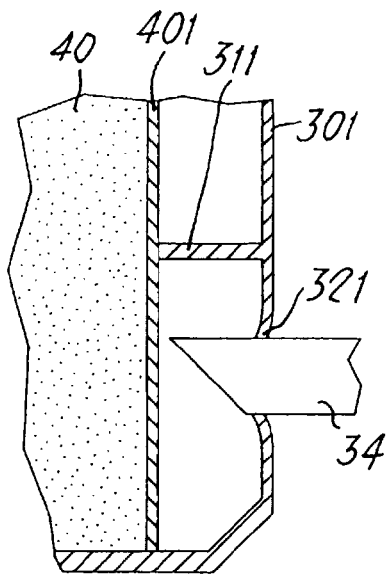
FIG. 4 is an enlarged detail from FIG. 1.
Figure 5:
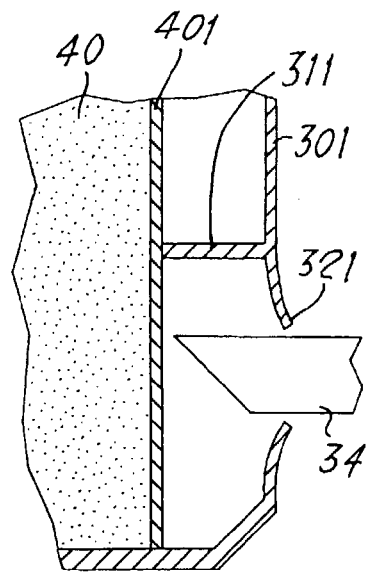
FIG. 5 is a detail similar to that of FIG. 4, illustrated in the next state of operation.

The way in which the prepacked serving in the embodiment described above works will now be explained. The cartridge 1 is placed in the brewing chamber 31, and the door 30 returned to the closed position shown in FIG. 1. At this point, two things happen: the mouth 22 breaks through the wall 201 at the prefracture lines 221, depressing the portions 211 and letting in the pressurized hot water arriving through the pipe 21, while at the same time the punch 34, or more correctly the two punches 34, as implied in FIG. 3, break through the wall 301 to form the holes 321. Referring now to FIGS. 4 and 5, in the detail of FIG. 4 the entry of the punch 34 into the wall 301 is visible, with the consequent formation of the hole 321. Because of the nature of the material—basically a thermoplastic, in which at least the wall 301 of the cartridge 1 is made, the edges of this hole 321 form a seal around the said punch 34. This seal effectively allows the water introduced into the cartridge 1 to reach a defined pressure before the coffee is dispensed (pre-brewing); at the same time, however, it is important that the wall 301 should not collapse completely, so the pressure of the water fed into the cartridge can be much less than that used in other appliances known in the prior art. FIG. 5, meanwhile, shows the moment at which the pressure in the cartridge, due to the pressurized hot water fed into the cartridge from the opposite side, overcomes the strength of the seal of the lip of the hole 321, allowing the brewed coffee to come out. By this simple means the coffee powder is brewed more satisfactorily and at the same time the freshness of the coffee powder is preserved in a very simple and inexpensive way, as the whole of the cartridge 1 is made of an airtight material and therefore prevents the product contained within it from ageing and becoming rancid (oxidation of the coffee).

Figure 6:
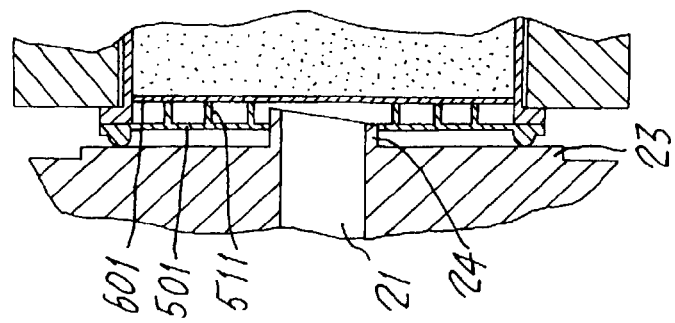
FIG. 6 is a cross section through a detail of a first variant of the present invention.
Figure 7:
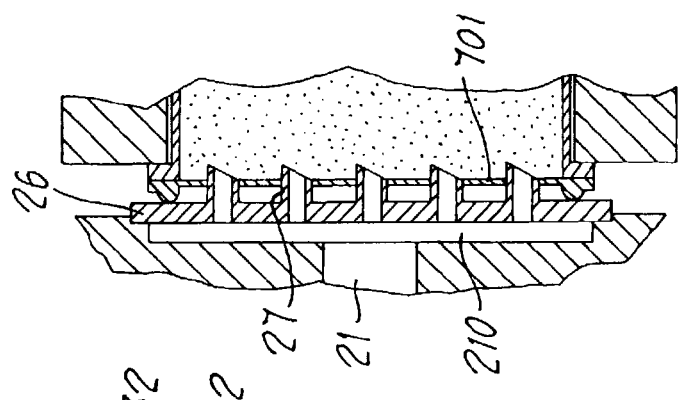
FIG. 7 is a cross section through a detail of a second variant of the present invention.

In the variant shown in FIG. 6, the supply head 23 has its mouth 24 pushed axially into the wall 501 of the cartridge 1. The wall has diffusion partitions 511 similar to those provided in the wall 301 on the opposite side of the cartridge (see FIGS. 1 to 5). Also, between the coffee powder 40 and the wall 501 is a layer 601 of filter material. The variant shown in FIG. 7 by contrast shows a supply head 26 provided with a plurality of mouths 27 pushed through the wall 701 of the cartridge 1. The head 26 communicates with the pipe 21 through the manifold 210.

In both these two variants, the purpose is basically similar, if addressed in different ways: in both cases the aim is to achieve the best possible distribution of the flow of hot water into the cartridge 1. In the variant shown in FIG. 6, the purpose is achieved by breaking up the flow arriving from the mouth 24 by means of the partitions 511, while in the variant shown in FIG. 7 the flow of water is broken up upstream by providing a greater number of mouths 27 capable of acting on the surface of the wall 701. The result in both cases is a better distribution of the flow of hot water through the coffee powder, so that it does not follow preferred paths which would basically run along the axis of the cartridge.

Figure 8:
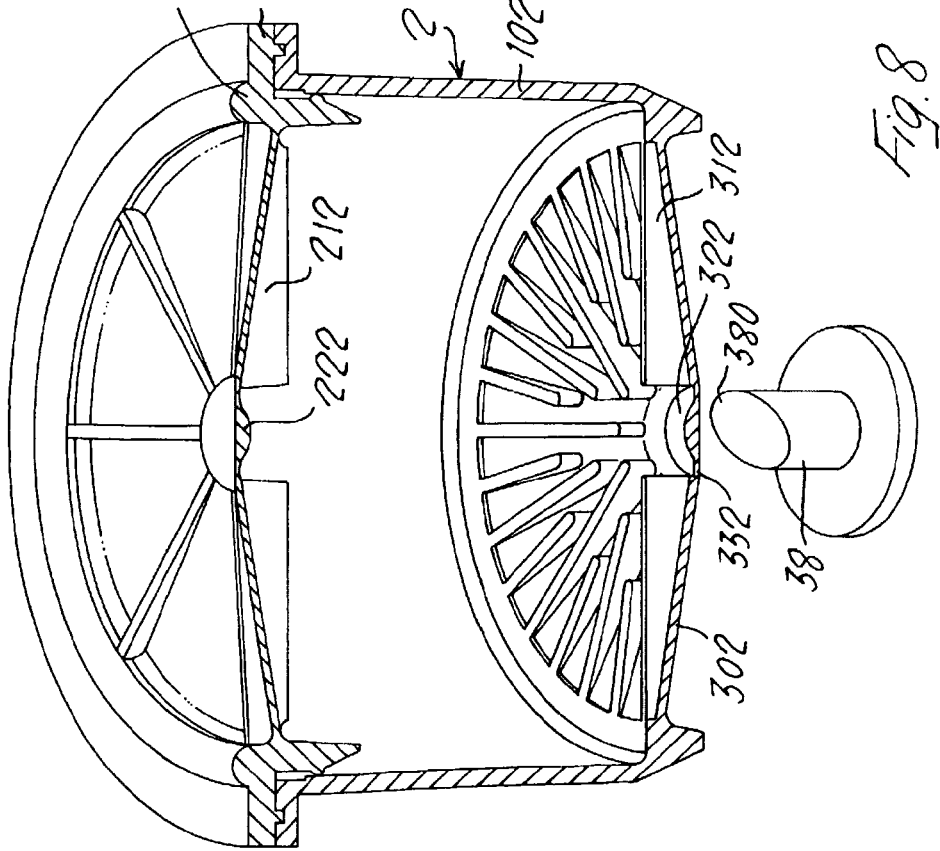
FIG. 8 is a perspective view with parts of cross section of a third variant of the present invention.

FIG. 8 shows another embodiment of the prepacked serving according to the present invention. The cartridge 2 is provided with the essentially cylindrical side wall 102, at the ends of which are the walls 202 and 302. The wall 302 has radial stiffening ribs 212 which run out from the central disc 222. There is also an annular relief 232, similar to that illustrated in respect of the cartridge 1 described earlier. The wall 302 is essentially a frustum of a cone culminating in a disc 322 which comprises a thin area 332 around its perimeter. Rising inwards from the wall of the cartridge are the diffusion partitions 312, formed in a similar way to and for the same purposes as those described previously. The cutting profile 380 of the pin 38 is designed to act on the disc 322. In the embodiment described above, the wall 202 facing the pressurized water supply means exhibits certain special features. To be specific, in place of the prefracture lines formed in the wall 201 of the capsule 1, it has ribs 212 which make the wall portion 202 in which they are formed more rigid, allowing the water supply means to break through in the area of the disc 222. Similarly, the partitions 312 have essentially the same purpose in the wall 302, besides contributing to the percolation of the brew towards the hole which the pin 38 will form in the area of the disc 322. Advantageously, the wall 302 slopes uniformly towards the said disc 322 in order further to help the brewed coffee to come out.

In the embodiment illustrated in FIG. 9, the cartridge 3 has an essentially cylindrical side wall 103 at the edge of the wall 203, on which wedge-like reliefs 243 are formed, surrounded by the thin areas 213 and 223. As may be seen in cross section in FIG. 10, each relief 243 is of a decreasing height. Around its outer edge is the thin area 213 and at its lower end is the thin area 223 of the wall 203.

FIG. 11 shows how the cartridge 3 works. At the moment when the door 30 is closed, the reliefs 243 come into contact with the wall 28 of the head 23, and are pushed into the cartridge 3. The thin areas 213 break, while the thin areas 223 allow the reliefs 243 to bend into the cartridge. In this way, although the head 23 has no means of penetration, openings are formed in the wall 203 of the cartridge 3 that allow the pressurized hot water to enter the serving of coffee powder 40.

The present invention has been described and illustrated with reference to an espresso coffee making coffee in which the brewing chamber is mounted in a hinged door; however, it will be obvious that by making limited suitable modifications, the same technique can also be adapted to all ordinary espresso coffee machines using a traditional filter holder, and that it can also be extended advantageously to coffee makers with direct-heating boilers, that is "moka" type coffee makers.

The invention claimed is:

1. A cartridge for a prepacked serving of coffee powder, said cartridge comprising:
   an essentially cylindrical side wall provided at its two ends with a first wall adapted to be acted upon by a pressurized hot-water supply means, said first wall being provided with predetermined weakened area to facilitate an action of the pressurized hot-water supply means, said predetermined weakened area comprise a thin area located approximately in a center of the first wall surrounded by a plurality of radial stiffening ribs formed on said first wall; and a second wall adapted to be acted upon by a brewed coffee dispenser, said wall being continuous and made of a thermoplastic material, wherein said cylindrical side wall and said first wall and said second wall are made of an essentially airtight material.

2. The cartridge of claim 1, wherein said first wall is provided with diffusion means for diffusing the flow of hot water.

3. The cartridge of claim 1, wherein said second wall has a channel for channelling the flow of brewed coffee.

4. The cartridge of claim 1, wherein the weakened area comprises a fracture area.

5. The cartridge of claim 1, wherein the weakened area comprises a pre-fracture line.

6. The cartridge of claim 1, wherein the weakened area is in the form of a pair of intersecting pre-fracture lines, located proximate a center of the first wall.

7. The cartridge of claim 1, wherein the cartridge is essentially airtight.

8. A dispensing unit adapted for use with the cartridge of claim 1, the unit comprising:

pressurized hot-water supply means for supplying hot water and for forming a hole in a first wall at a top of a cartridge containing coffee;

a brewing chamber; and a dispensing means for dispensing the brewed coffee, said dispensing means comprising perforating means for forming at least one hole in a second wall at a bottom of the cartridge, wherein said perforating means is adapted to puncture the second wall of the cartridge, while at the same time, forming a seal with lips of the second wall which surround the hole, thereby preventing fluid to be dispensed from the cartridge through the second wall until a defined pressure has built up inside said cartridge, at which point fluid is dispensed from around the perforation means in a space defined between an exterior surface of the perforation means and the hole in the second wall.

9. The dispensing unit of claim 8, wherein said perforating means is located on a back wall of the brewing chamber where there is a dispensing manifold communicating with a dispensing pipe.

10. The dispensing unit of claim 8, wherein said supply means comprises at least one mouth means for breaking through the first wall of said cartridge.

11. The dispensing unit of claim 8, wherein the hot-water supply means is located above the brewing chamber and the perforating means is located below the brewing chamber.

* * * * *

UNITED STATES PATENT AND TRADEMARK OFFICE
CERTIFICATE OF CORRECTION

PATENT NO.       : 7,640,842 B2  
APPLICATION NO. : 10/588847  
DATED            : January 5, 2010  
INVENTOR(S)      : Bruno Bardazzi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this

Sixteenth Day of November, 2010

David J. Kappos  
*Director of the United States Patent and Trademark Office*

UNITED STATES PATENT AND TRADEMARK OFFICE
CERTIFICATE OF CORRECTION

PATENT NO. : 7,640,842 B2
APPLICATION NO. : 10/588847
DATED : January 5, 2010
INVENTOR(S) : Bruno Bardazzi It is certified that error appears in the above-identified patent and that said Letters Patent is hereby corrected as shown below:

On the Title page, please add section (73) as follows:

--(73) Assignee: ESPRESSOCAP S.r.l., Milan (IT)--

Signed and Sealed this
Twenty-second Day of February, 2011

David J. Kappos
*Director of the United States Patent and Trademark Office*